(12) United States Patent
Graham et al.

(10) Patent No.: US 8,707,322 B2
(45) Date of Patent: *Apr. 22, 2014

(54) DETERMINING SUITABLE NETWORK INTERFACE FOR PARTITION DEPLOYMENT/RE-DEPLOYMENT IN A CLOUD ENVIRONMENT

(71) Applicant: International Business Machines Corporation, Armonk, NY (US)

(72) Inventors: Charles S. Graham, Rochester, MN (US); Bryan M. Logan, Rochester, MN (US); Kyle A. Lucke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,095

(22) Filed: Dec. 5, 2012

(65) Prior Publication Data

US 2013/0097610 A1    Apr. 18, 2013

Related U.S. Application Data

(63) Continuation of application No. 12/952,806, filed on Nov. 23, 2010.

(51) Int. Cl.
| | |
|---|---|
| *G06F 9/46* | (2006.01) |
| *G06F 3/00* | (2006.01) |
| *G06F 13/00* | (2006.01) |
| *G06F 15/167* | (2006.01) |
| *G06F 15/173* | (2006.01) |
| *G06F 15/16* | (2006.01) |

(52) U.S. Cl.
USPC ............ 718/104; 718/105; 710/20; 710/21; 710/33; 709/213; 709/223; 709/232

(58) Field of Classification Search
None
See application file for complete search history.

(56) References Cited

U.S. PATENT DOCUMENTS

| | | | | |
|---|---|---|---|---|
| 7,634,595 | B1 * | 12/2009 | Brown et al. | 710/38 |
| 7,707,331 | B1 * | 4/2010 | Brown et al. | 710/38 |
| 2003/0131154 | A1 | 7/2003 | Downer et al. | |
| 2006/0274774 | A1 | 12/2006 | Srinivasan et al. | |
| 2008/0080544 | A1 | 4/2008 | Mani et al. | |
| 2008/0126648 | A1 | 5/2008 | Brownlow et al. | |
| 2009/0144731 | A1 | 6/2009 | Brown et al. | |
| 2009/0276773 | A1 | 11/2009 | Brown et al. | |

OTHER PUBLICATIONS

International Search Report and Written Opinion of the ISA dated Feb. 29, 2012—International Application No. PCT/EP2011/070704.
U.S. Appl. No. 12/952,806, entitled Determining Suitable Network Interface for Partition Deployment/Re-Deployment in a Cloud Environment, filed Nov. 23, 2010.

* cited by examiner

*Primary Examiner* — Emerson Puente
*Assistant Examiner* — Adam Lee
(74) *Attorney, Agent, or Firm* — Patterson & Sheridan, LLP

(57) ABSTRACT

Migrating a logical partition (LPAR) from a first physical port to a first target physical port, includes determining a configuration of an LPAR having allocated resources residing on a computer and assigned to the first physical port of the computer. The configuration includes a label that specifies a network topology that is provided by the first physical port and the first target physical port has a port label that matches the label included in the configuration of the LPAR. The first target physical port with available capacity to service the LPAR is identified and the LPAR is migrated from the first physical port to the target physical port by reassigning the LPAR to the first target physical port.

9 Claims, 10 Drawing Sheets

Port Profile Properties: <u>600</u>

Select label for the logical partition:

| Item <u>604</u> | ▽ |
| Item <u>606</u> | ▽ |
| Item <u>608</u> | ▽ |

Specify sub-label for the logical partition:

| Item <u>612</u> | ▽ |
| Item <u>614</u> | |
| Item <u>616</u> | |

| Reset <u>615</u> | Configure <u>605</u> | OK <u>607</u> | Help <u>609</u> | Cancel <u>610</u> |

Figure 6A

Logical Partition Profile Properties: LPAR1 _602_

Select a network adapter physical port:

| Select | Port ID | Port Label | Port Sub-Label | |
|--------|---------|------------|----------------|---|
| ○ | 1 | External | RouterA | 622 |
| ○ | 3 | Database External | RouterB | 624 |
| ○ | 5 | Database Internal | LabNJ300 | 626 |
| ○ | 6 | Database Internal | LabNJ420 | 628 |

| Reset _632_ | Configure _634_ | OK _636_ | Help _638_ | Cancel _640_ |

Figure 6B

Logical Partition Profile Properties: LPAR1   702

Label(s) for the logical partition configuration:

| Item 704 |
|----------|
| Item 706 |

Sub-label(s) for the logical partition configuration:

| Item 712 |
|----------|
| Item 714 |

Select a network adapter physical port:

| Select | Port ID | Port Label(s) | Port Sub-Label(s) | |
|--------|---------|---------------|-------------------|---|
| ○ | 3 | Database External | RouterB | —722 |
| ○ | 8 | Database External | | —724 |
| ○ | 6 | Database External | LabNJ420 | —726 |
| ○ | 4 | External | | —728 |

| Reset 732 | Configure 734 | OK 736 | Help 738 | Cancel 740 |
|-----------|---------------|--------|----------|------------|

Figure 7B

DETERMINING SUITABLE NETWORK INTERFACE FOR PARTITION DEPLOYMENT/RE-DEPLOYMENT IN A CLOUD ENVIRONMENT

CROSS-REFERENCE TO RELATED APPLICATIONS

This application is a continuation of co-pending U.S. patent application Ser. No. 12/952,806, filed Nov. 23, 2010. The aforementioned related patent application is herein incorporated by reference in its entirety.

BACKGROUND

The field of the invention relates to configuring a partition to use physical ports, provisioning the partition, and migrating the partition to a different physical port.

In a logically partitioned ("LPAR") computer system, available system resources are allocated among multiple sets of resources so that each set of resources can be operated independently of the other. The task of splitting these resources among logical partitions is typically accomplished via a layer of software components commonly referred to as a hypervisor or, more generally, a partition manager.

The partition manager executes between the underlying hardware and the various logical partitions. One objective of a partition manager is to allow each logical partition to run software, such as operating systems and operating system specific applications that are typically developed to run on a dedicated computer system with little or no modification. For example, a system administrator may want one logical partition to run IBM's OS/400 operating system, a second logical partition to run IBM's AIX operating system, and a third logical partition to run the LINUX operating system. By providing the ability to run multiple operating systems on the same computer system, a LPAR computer system may provide a user with a great deal of freedom to choose the application software best suited to the users' need and with little or no regard to the operating system for which the application program was written. Running multiple logical partitions on a single system can better utilize system resources; for example, the utilization of processors and memory on a logical partitioned system is typically higher than separate systems. System resources can also be moved from one logical partition to another as required.

SUMMARY

The present invention generally includes a system, article of manufacture and method for specifying physical port characteristics required by a partition for purposes of configuring the partition, provisioning the partition, and migrating the partition from one physical port to another. The physical ports of network adapters are labeled to indicate specific network topologies that are supported by the physical port, e.g., internal network, external network, database, and the like. These labels are then used to assign the partition to a particular physical port of a system and to migrate the partition from one port to another.

According to one embodiment of the invention, a method, system and article of manufacture of migrating a logical partition (LPAR) from a first physical port to a first target physical port, includes determining a configuration of an LPAR having allocated resources residing on a computer and assigned to the first physical port of the computer, the configuration including a label that specifies a network topology provided by the first physical port. The embodiment also comprises identifying the first target physical port with available capacity to service the LPAR and migrating the LPAR from the first physical port to the target physical port by reassigning the LPAR to the first target physical port, where the first target physical port has a port label that matches the label included in the configuration of the LPAR.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 6A illustrates a graphical user interface (GUI) for labeling a port, according to one embodiment of the invention.

FIG. 6B illustrates a GUI for configuring a partition by assigning the partition to a port, according to one embodiment of the invention.

FIG. 7B illustrates a GUI for manually migrating a partition, according to one embodiment of the invention.

DETAILED DESCRIPTION

Figure 1:
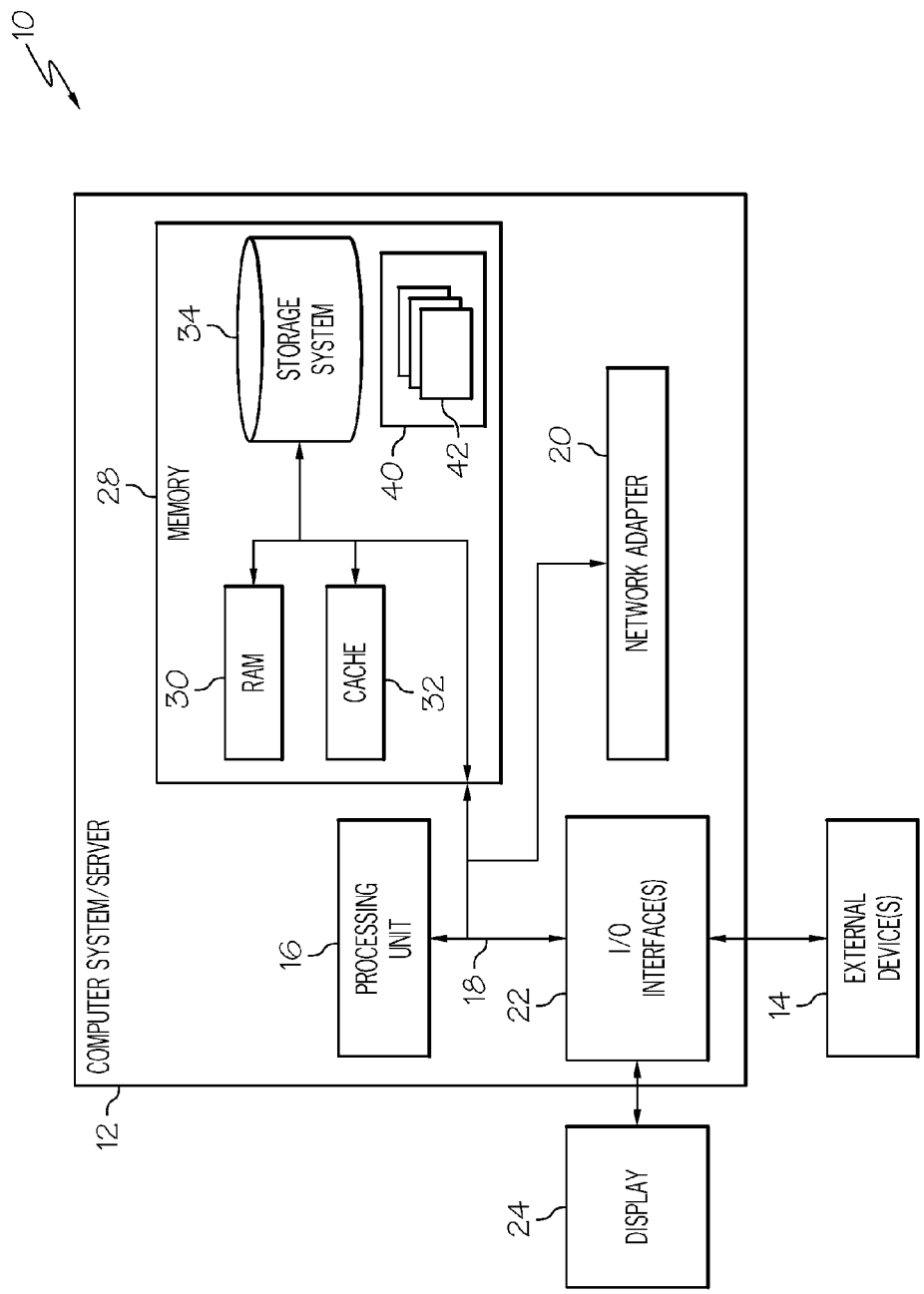
FIG. 1 depicts a cloud computing node according to an embodiment of the present invention.

One of the resources provided by a computer on which a given logical partition exists is a network adapter, which provides internal and external interfaces. When a partition migrates from a first port to a second port, the interfaces needed by the partition must be provided by the second port. For example, when a partition is on an internal network, the second port must also be on the internal network. A particular challenge arises when migrating a partition requiring access to an internal network to a port providing only access to an external network. Accordingly, embodiments of the present invention relate to configuring a partition to use physical ports, provisioning the partition, and migrating the partition to a different port.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
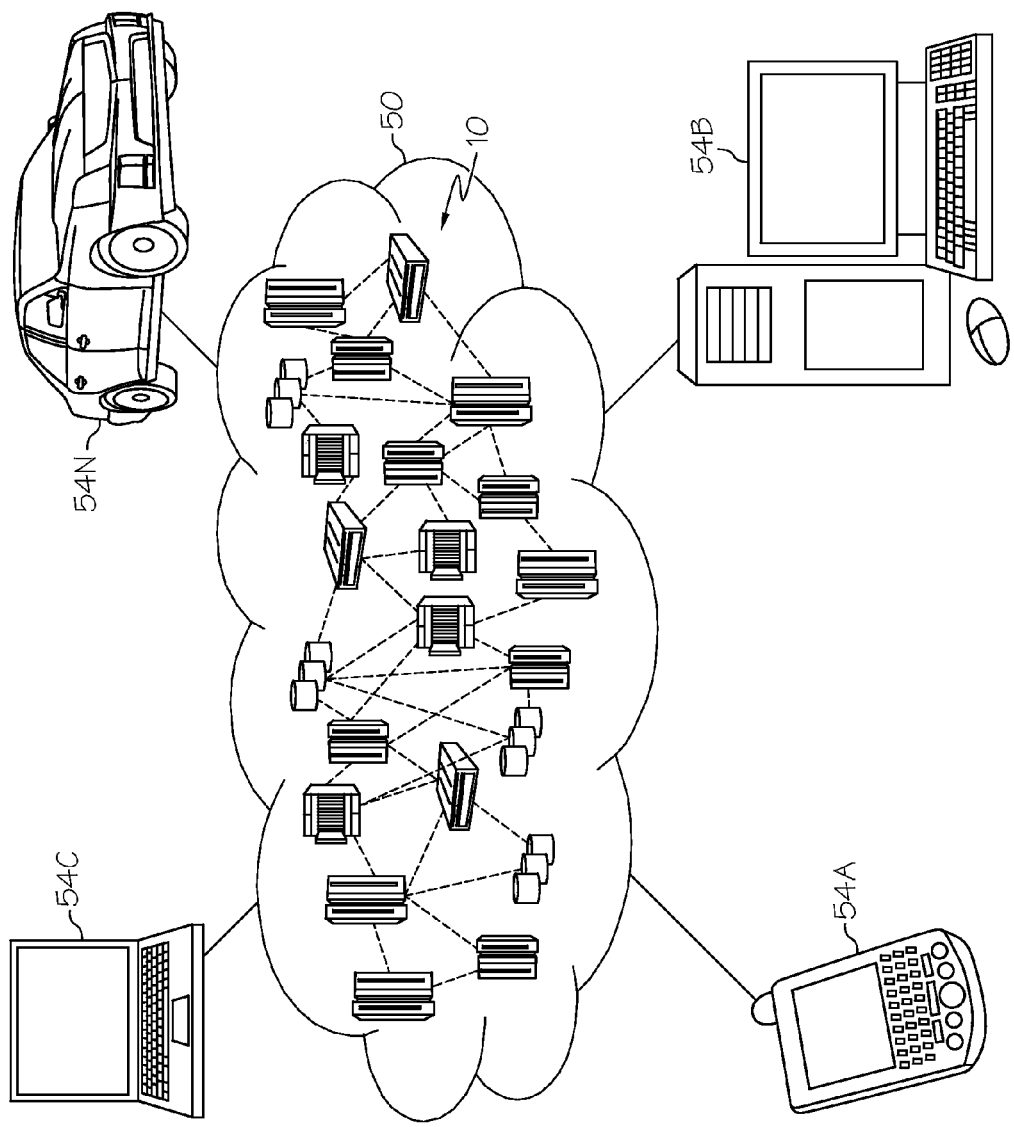
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
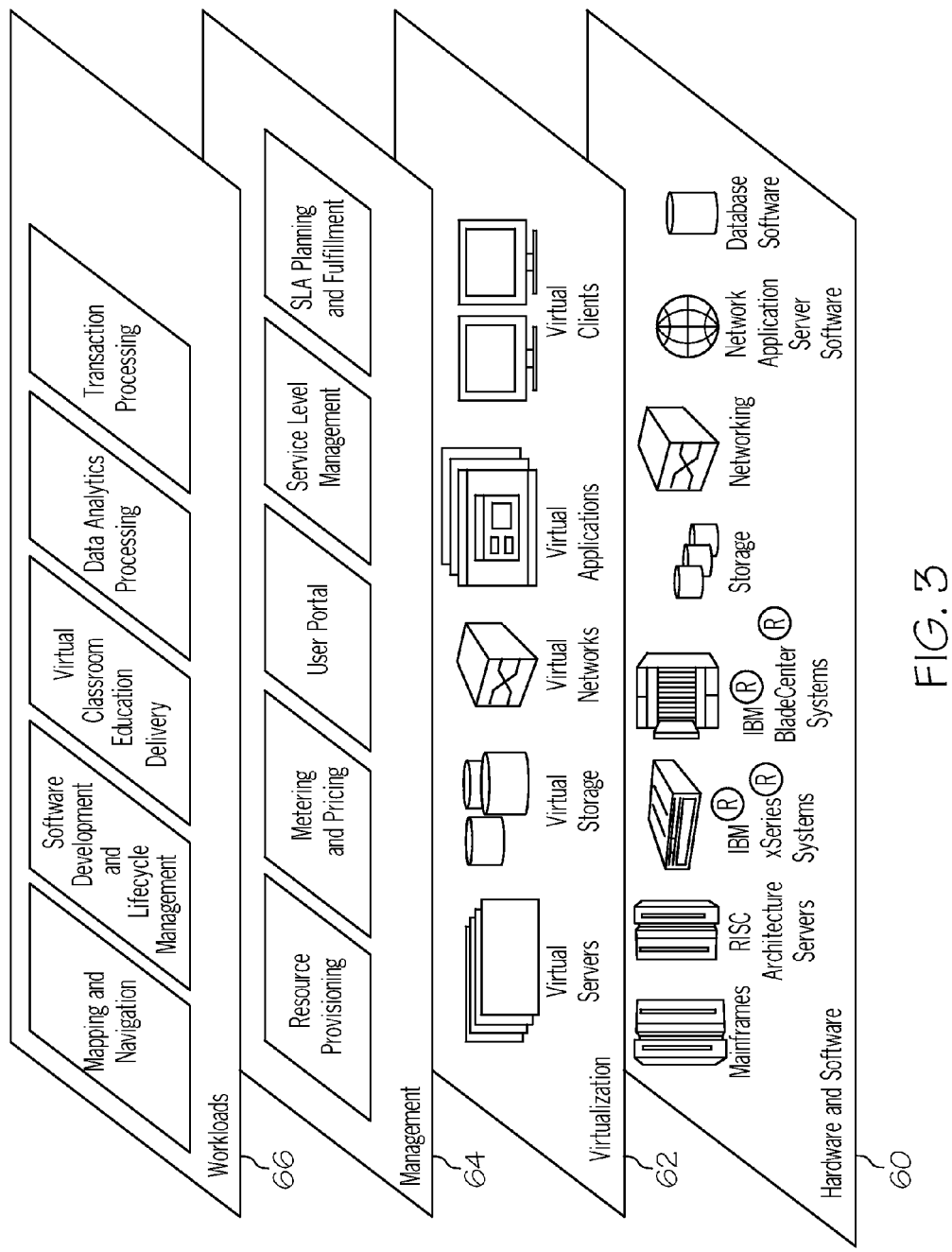
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. A hardware management console may be configured that allows a user to specify network topologies that a physical port provides by adding a label and by one or more optional sub-labels to the port. These labels are then used to assign the logical partition to a particular physical port of a computer. A migration manager may use the labels to automatically migrate one or more partitions from one port to another. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may use a hardware management console to configure virtualized network adapters to have label indicating specific network topologies that are supported by the port, e.g., internal network, external network, database, and the like. The user may also use the hardware management console to specify network topologies that a port provides by adding a label and by one or more optional sub-labels. These labels are then used to assign the logical partition to a particular physical port of a computer. A migration manager may use the labels to automatically migrate one or more partitions from one port to another. Applications or related data available in the cloud may then be accessed through the logical partition. For example, the applications executing in the logical partition on a computing system in the cloud continue to execute when the logical partition is migrated from one port to another port in the cloud.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
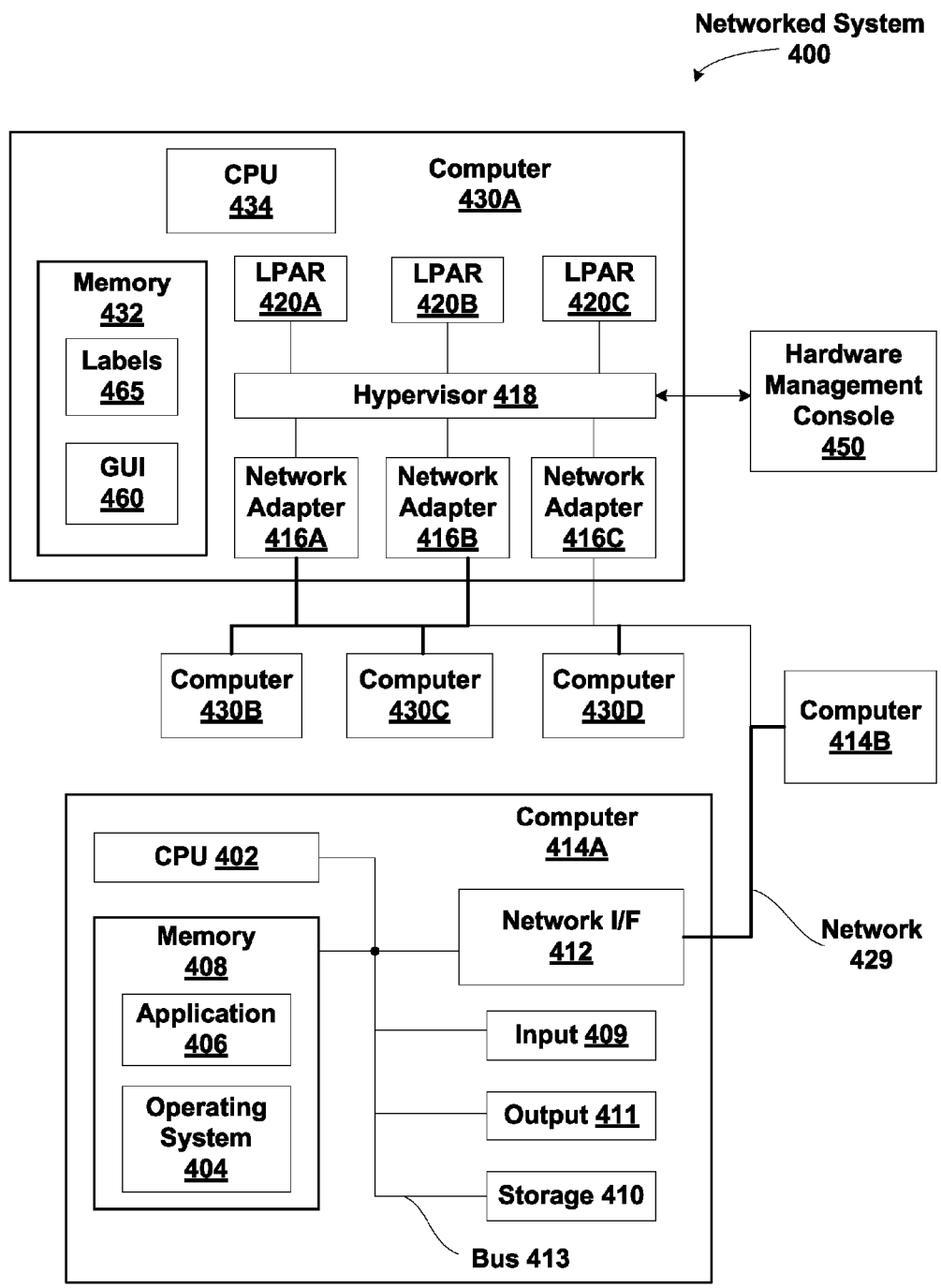
FIG. 4 depicts a block diagram of a networked system in which embodiments of the present invention may be implemented.

FIG. 4 depicts a block diagram of a networked system 400 in which embodiments of the present invention may be implemented. In general, the networked system 400 includes a client (e.g., user's) computer (two such client computers 414A-B are shown; also separately (and collectively) referred to as computer(s) 414) and at least one server computer (four such computers 430A-D are shown; also separately (and collectively) referred to as computer(s) 430. Computers generally are single devices with resources for computer processing, including processors, memory and storage.

Computer 414A and computer 430A are representative of one particular embodiment of a client and server, respectively. The computer 414A and computer 430A are connected via a network 429. In general, the network 429 may be a local area network (LAN) and/or a wide area network (WAN). In a particular embodiment, the network 429 is the Internet. Computers 430 may be network servers, web servers, or any other computer that uses a network adapter (NA) 416 (as shown network adapters 416A-C are associated with LPARs 420A-C, respectively) to communicate with computers 414 and other computers 430 over network 429. A NA 416 is a piece of computer hardware designed to enable computers to communicate over computer networks. Typically, NAs 416 provide physical access to a networking medium and a low-level addressing system for sending and receiving network traffic. In one embodiment, a shared network adapter is used that is shared by multiple LPARs 420 in a computer 430.

The computer 414A includes a Central Processing Unit (CPU) 402 connected via a bus 413 to a memory 408, storage 410, an input device 409, an output device 411, and a network interface device 412. The input device 409 can be any device to give input to the computer 414A. For example, a keyboard, keypad, light pen, touch-screen, track-ball, or speech recognition unit, audio/video player, and the like could be used. The output device 411 can be any device to give output to the user, e.g., any conventional display screen or set of speakers, along with their respective interface cards, i.e., video cards and sound cards (not shown). Although shown separately from the input device 409, the output device 411 and input device 409 could be combined. For example, a display screen with an integrated touch-screen, a display with an integrated keyboard, or a speech recognition unit combined with a text speech converter could be used.

The network interface device 412 may be any entry/exit device configured to allow network communications between the computer 414A and the computers 430 via the network 429. For example, the network interface device 412 may be a network adapter or other network interface card (NIC).

Storage 410 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 408 and storage 410 could be part of one virtual address space spanning multiple primary and secondary storage devices.

The computer 414A is generally under the control of an operating system 404, which is shown in the memory 408. Illustrative operating systems, which may be used to advantage, include Linux® and Microsoft Windows®. Linux is a trademark of Linus Torvalds in the US, other countries, or both.

The memory 408 is preferably a random access memory sufficiently large to hold the necessary programming and data structures of client applications. While the memory 408 is shown as a single entity, it should be understood that the memory 408 may in fact comprise a plurality of modules, and that the memory 408 may exist at multiple levels, from high speed registers and caches to lower speed but larger DRAM chips.

Illustratively, the memory 408 includes an application 406 that, when executed on CPU 402, provides support for exchanging information between the various servers 430 and locating network addresses at one or more of the servers 430. In one embodiment, the application 406 is a browser that includes a web-based Graphical User Interface (GUI), which allows the user to navigate and display web-pages located on the Internet. However, more generally the application may be a thin client application configured to transfer data (e.g., HTML, XML, etc.) between the computer 414A and the computers 430 via, for example, HTTP.

An instance of server resources is represented by computer 430A. In particular, computer 430A generally contains one or more network adapters 416, memory 432, CPU 434, and graphical user interface (GUI) 460. The computer 430A is divided up into logical partitions 420 (LPARs), three shown in this case. An LPAR 420 is an allocation of resources (e.g., memory, processors, storage, etc.) within a computer 430A. Each LPAR 420 has a respective operating system and behaves as a single system with control over the resources allocated to the particular LPAR 420. The respective operating systems could be the same or different. Examples of operating systems are Linux®, AIX®, and i5/OS®, although other operating systems could potentially be implemented. Although three LPARs 420 are illustrated in FIG. 4, the number of LPARs on any one server 430 is limited only by the resources available on computer 430. LPARs 420 may be managed by a hypervisor 418, which is referred to as a partition manager in some systems. The computer 430A may also include a hardware management console 450 that interfaces with the hypervisor 418 and the hypervisors on other computers 430.

When a computer is connected to a network, each LPAR may use network communications, and accordingly require NAs 416 to send and receive network traffic. The memory 432 stores labels 465 that define network topologies provided by ports of the NAs 416. Hardware management console 450 interfaces with GUI 460 to add a label to a NA 416 and to assign or reassign an LPAR 420 to a particular port of NA 416.

Figure 5:
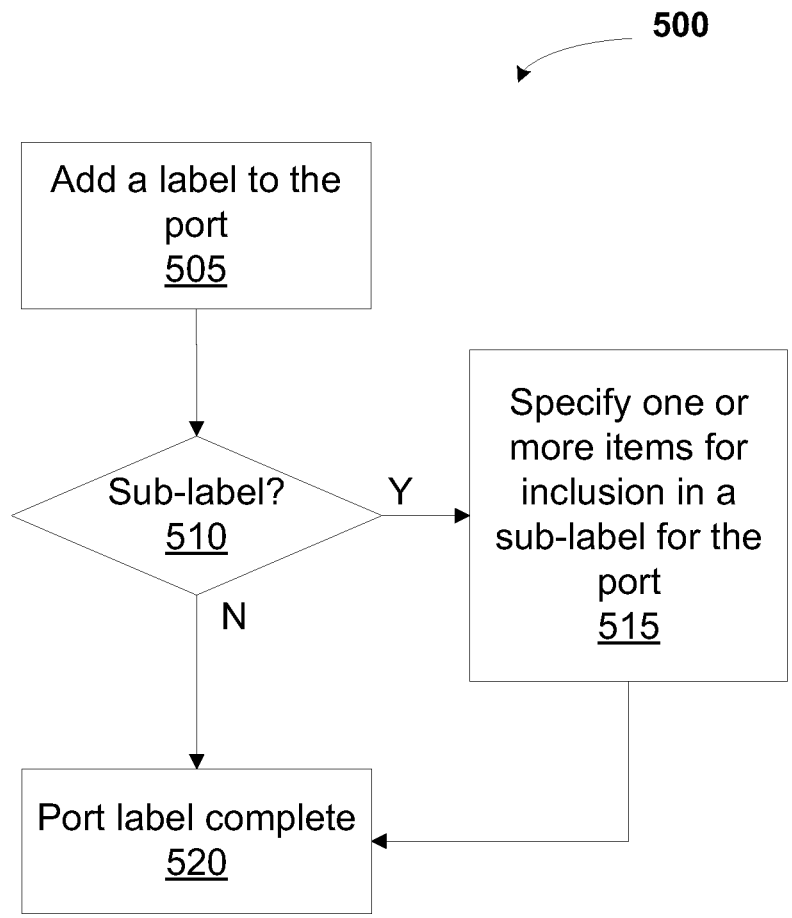
FIG. 5 is a flowchart illustrating a method for configuring a port of a network adapter, according to one embodiment of the invention.

FIG. 5 is a flowchart 500 illustrating a method for configuring a port of a network adapter 416, according to one embodiment of the invention. Reference will be made to elements introduced above and described with respect to FIGS. 1, 2, 3, and 4. After partitioning a computer 430 into one more LPARs 420, a user may use a hardware management console 450 to configure an NA 416 to add labels to each port of the NA 416.

At step 505, the user adds a label to a port. The label may be a text string that indicates a specific network topology that is supported by the physical port, e.g., internal network, external network, database, and the like. The port may have a label that includes more than a single topology. Additionally, the user may also specify items that are not included in the list. At step 510, the user is prompted to add a sub-label to the physical port. If, at step 510, the user determines that a sub-label (e.g., also a text string) will not be added, then the user proceeds directly to step 520.

Otherwise, at step 515 the user specifies one or more items for inclusion in a sub-label for the port. The sub-label specifies a characteristic of the physical port. Examples of sub-labels defined by the user may include particular physical locations of the computer 430 or purposes of the port, such as RouterA, LabNJ, HR Department, and the like. At step 520 labeling of the port is complete. The label may be provided to the hypervisor 418 and stored in labels 465.

FIG. 6A illustrates the GUI 460 for labeling a port of a NA 416, according to one embodiment of the invention. GUI 460 contains a partition ID element, Port Profile Properties: 600, label items 604, 606, and 608, sub-label items 612, 614, and 616, reset button 615, configure button 605, ok button 607, help button 609, and cancel button 610. It should be noted that GUI 460 could be represented in one or more screens, according to the particular implementation of any one embodiment of the invention.

Partition ID element 600 identifies the current port that is being labeled. Label items 604, 606, and 608 are drop-down lists for the user's selection of the items (specific network topologies) that are provided by the port. As is shown, Label elements 604, 606, and 608 are drop-down lists, but could be represented as other known or unknown GUI embodiments (e.g., radio buttons) that are configured for user-selection of an item from one or more available items. According to one embodiment of the invention, after the user selects an item, the hardware management console 450 updates label items 604, 606, and 608 to display the respective selected item. Similarly, sub-label item 612 is a drop-down list for the user's selection of a sub-label item for port. According to one embodiment of the invention, after the user selects an item, the hardware management console 450 updates sub-label item 612 to display the respective selected item. The selectable items could be represented within other known or unknown GUI embodiments that are configured for user-selection of an item from one or more available items. Sub-label items 614 and 616 are text entry fields that a user may type into to specify a sub-label item for the LPAR 420. One or more of label items 604, 606, and 608 may also provide a text entry field that a user may type into to specify a label item for the port.

According to one embodiment of the invention, the reset button 615 may be configured to clear the specified items. The configure button 605 may be used to inform the hardware management console 450 that the selected port is labeled. The OK button 607 may be configured to commit the labels and sub-labels specified to the port and store the specified labels and sub-labels in labels 465. The Help button 609 may be configured to display help information regarding labeling the physical port. Cancel button 610 may be configured to close the GUI 460.

FIG. 6B illustrates the GUI 460 for configuring an LPAR 420 by assigning the LPAR 420 to a port, according to one embodiment of the invention. GUI 460 contains a partition ID element, Logical Partition Profile Properties: LPAR1 602, port selection elements 622, 624, 626, and 628, reset button 632, configure button 634, ok button 636, help button 638, and cancel button 640. It should be noted that GUI 460 could be represented in one or more screens, according to the particular implementation of any one embodiment of the invention.

Partition ID element 602 identifies the current LPAR 420 that is being configured. The GUI 460 provides an interface that allows a user to assign an LPAR 420 to a network adapter physical port that has a label. The network adapter physical port may also have a sub-label including one or more items. Each row 622, 624, 626, and 628 represents one physical port on NA 416. Row 622 includes a physical port select element, physical port ID element, port label, and port sub-label. As is shown, the physical port select element is a radio button, but could be any known or unknown GUI selection element configured for user-selection of a physical port ID from one or more physical port IDs. Physical ports for multiple NAs 416 may be displayed for user selection. Allocating a port to LPAR 420A may take place anytime after LPAR 420A is created and NA 416A is installed on server 430A. A logical adapter handles network traffic for the LPAR 420 by sending and receiving traffic through the physical port that is allocated to the LPAR 420.

According to one embodiment of the invention, the hardware management console 450 displays GUI 460, presenting a list of all physical ports on the NA 416. For example, after selecting NA 416A for LPAR 420A, the GUI 460 displays rows 622, 624, 626, and 628. When the user selects a physical port corresponding to portID=1 in row 622, that physical port is assigned to the LPAR 420A. The LPAR 420 also inherits the label and sub-labels specified for the selected physical port, e.g., label external network and sub-label RouterA. The label and sub-labels of the selected physical port are included as the partition configuration for the LPAR 420A.

As shown in FIG. 6B, the physical port corresponding to portID=3 in row 624 has a label including Database and External network and a sub-label including RouterB. The physical port corresponding to portID=5 in row 626 has a label including Database and Internal network and a sub-label including LABNJ300. The physical port corresponding to portID=6 in row 628 has a label including Database and Internal network and a sub-label including LABNJ420.

According to one embodiment of the invention, the reset button 632 may be configured to de-select the physical port select elements. The configure button 634 may be used to inform the hardware management console 450 that the selected port is assigned to the LPAR 420. The OK button 636 may be configured to commit the labels and sub-labels specified to the partition configuration for the LPAR 420 and store the specified labels and sub-labels in labels 465. The Help button 638 may be configured to display help information regarding configuring the LPAR 420 and/or assigning a physical port to the LPAR 420. Cancel button 640 may be configured to close the GUI 460.

Figure 7A:
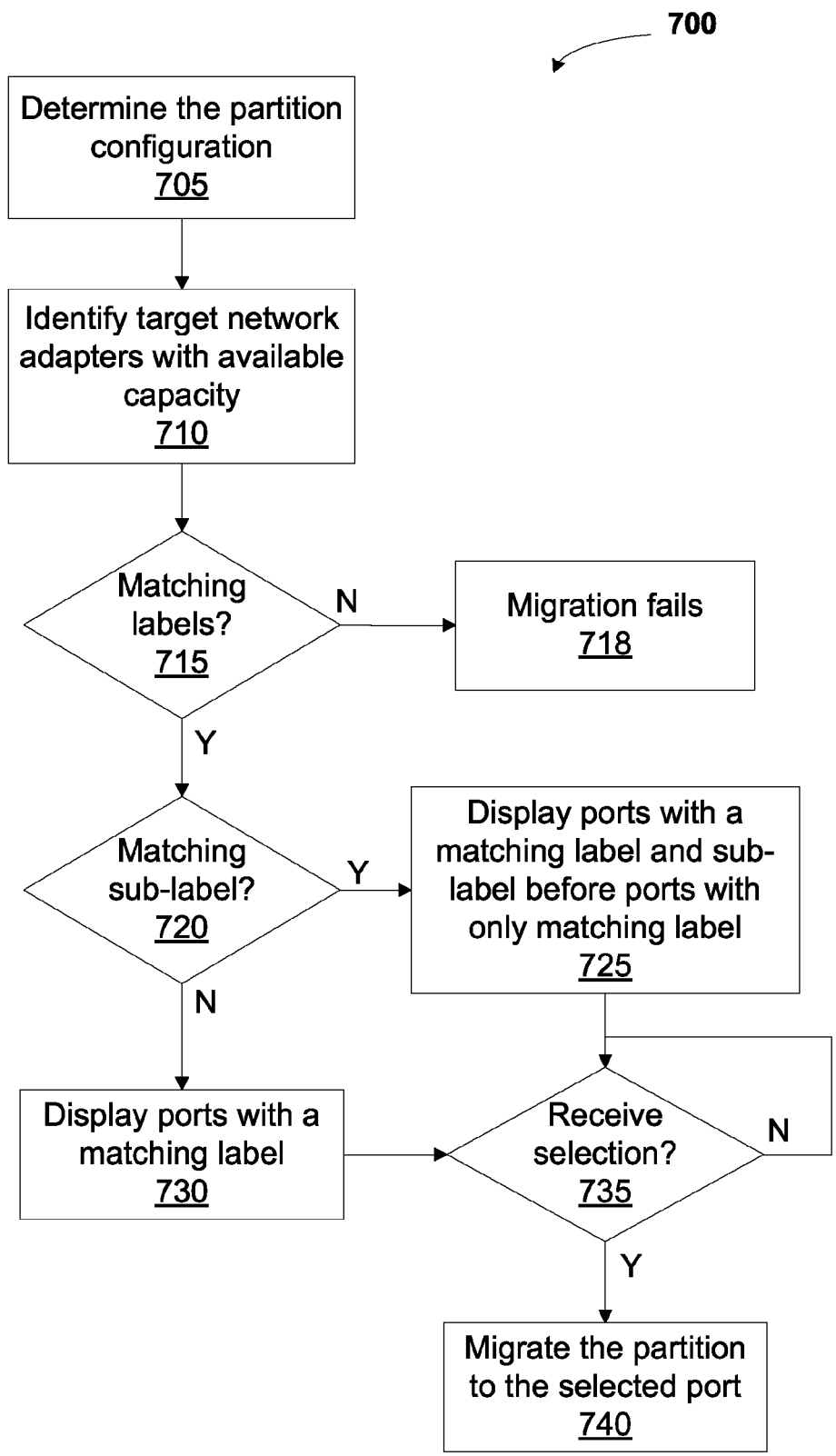
FIG. 7A is a flowchart illustrating a method for manually migrating a partition from one port of a network adapter to another port, according to one embodiment of the invention.

FIG. 7A is a flowchart 700 illustrating a method for manually migrating a LPAR 420 from one network adapter 416 to another network adapter 416, according to one embodiment of the invention. At step 705 the hardware management console 450 determines the LPAR 420 configuration based on the label and any sub-label of the physical port to which the LPAR 420 is assigned (the current port). More specifically, the hardware management console 450 may determine the specific network topology that is needed by LPAR 420 based on the label and sub-label. The hardware management console 450 may be configured to display the label and sub-label included in the configuration for the LPAR 420 via the GUI 460.

At step 710 the hardware management console 450 identifies target NAs 416 with available capacity to service the LPAR 420. At step 715 the hardware management console 450 determines if any of the target NAs 416 have ports with labels that match the label included in the configuration for the LPAR 420. If, at step 715 none of the target NAs 416 have ports with labels that match the label of the LPAR 420, then at step 718 the migration fails. The user may be informed via an error message that no ports are available for the migration. Otherwise, at step 720 the hardware management console 450 determines if any of the ports with a matching label also have a sub-label that matches the sub-label included in the configuration for the LPAR 420. When the current port does not have a sub-label, then any sub-label of a port is considered to be matching sub-label.

If, at step 720 the hardware management console 450 determines that any of the ports with a matching label also have a sub-label that matches the sub-label included in the configuration for the LPAR 420, then at step 725 the hardware management console 450 displays (via the GUI 460) the ports with a matching label and matching sub-label before the ports with only a matching label. In one embodiment, the ports having a matching label and matching sub-label may appear in earlier rows compared with the ports having only a matching label. In another embodiment, the ports having a matching label and matching sub-label may appear on different tabs or screens of the GUI 460.

If, at step 720 the hardware management console 450 determines that none of the ports with a matching label also have a sub-label that matches the sub-label included in the configuration for the LPAR 420, then at step 730 the hardware management console 450 displays (via the GUI 460) the ports with a matching label. At step 735 the hardware management console 450 waits to receive a port selection from the user. When a selection is received, at step 740 the hardware management console 450 instructs the migration application to reassign the LPAR 420 from the current port to the selected port.

FIG. 7B illustrates a GUI for manually migrating a partition, according to one embodiment of the invention. GUI 460 contains a partition ID element, Logical Partition Profile Properties: LPAR1 702, label items 704 and 706, sub-label items 712 and 714, port selection elements 722, 724, 726, and 728, reset button 732, configure button 734, ok button 736, help button 738, and cancel button 740. It should be noted that GUI 460 could be represented in one or more screens, according to the particular implementation of any one embodiment of the invention.

Partition ID element 702 identifies the current LPAR 420 that is being migrated from a first port to a second port. Label items 704 and 706 indicate the items (specific network topologies) that are provided by the first port (the physical port to which the LPAR 420 is assigned) as previously specified by the user. Similarly, sub-label items 712 and 714 indicate the items that are specified for the first port by the user. The label items and sub-label items are included in the configuration for the LPAR 420.

The hardware management console 450 identifies target ports of NAs 416 based on the label items 704 and 706 and the sub-label items. The GUI 460 displays the target ports in rows 722, 724, 726, and 728. Any target ports that match the label and sub-label included in the configuration for the LPAR 420 are displayed before target ports that match the label and do not match the sub-label included in the configuration for the LPAR 420. A first row 722 includes a physical port select element, physical port ID element (port ID 3), port label including Database and External Network, and port sub-label including RouterB. As is shown, the physical port select element is a radio button, but could be any known or unknown GUI selection element configured for user-selection of a physical port ID from one or more physical port IDs. The port ID 3 label of Database and External network and the sub-label of RouterB matches the label and sub-label included in the configuration for the LPAR 420. Note that the configuration for the LPAR 420 may use a wildcard for the sub-label instead of "RouterB." For example, when LPAR 420 uses "Router*" for the sub-label, any physical port sub-label item starting with "Router" will match the sub-label included in the configuration for the LPAR 420.

A second row 724 includes a physical port select element, physical port ID element (port ID 8), port label including Database and External Network, and no port sub-label. The port ID 8 label of Database and External network matches the label included in the configuration for the LPAR 420. Because the port ID 8 has no sub-label to match the RouterB sub-label included in the configuration for the LPAR 420, the port ID 8 is displayed following the port ID 3 in the list of target ports. A third row 726 includes a physical port select element, physical port ID element (port ID 6), port label including Database and External Network and the port sub-label of LabNJ420. The port ID 6 label of Database and External network matches the label included in the configuration for the LPAR 420, but the sub-label of LabNJ420 does not match the sub-label included in the configuration for the LPAR 420. Therefore, the port ID 6 is displayed following the port ID 8 whose label exactly matches the label included in the configuration for the LPAR 420 and does not have a sub-label. A fourth row 728 includes a physical port select element, physical port ID element (port ID 4), port label including External Network and no port sub-label. The port ID 4 label of External network matches one item in the label included in the configuration for the LPAR 420. Therefore, the port ID 4 is displayed following the other port IDs whose label exactly matches the label included in the configuration for the LPAR 420.

According to one embodiment of the invention, the reset button 732 may be configured to de-select the physical port select element. The configure button 734 may be used to inform the hardware management console 450 that the selected port is selected for assignment to the LPAR 420. The OK button 736 may be configured to migrate the LPAR 420 from the first port to the selected port. The Help button 738 may be configured to display help information regarding configuring the LPAR 420 and/or migrating the LPAR 420 from a first port to a second port. Cancel button 740 may be configured to close the GUI 460.

Figure 7C:
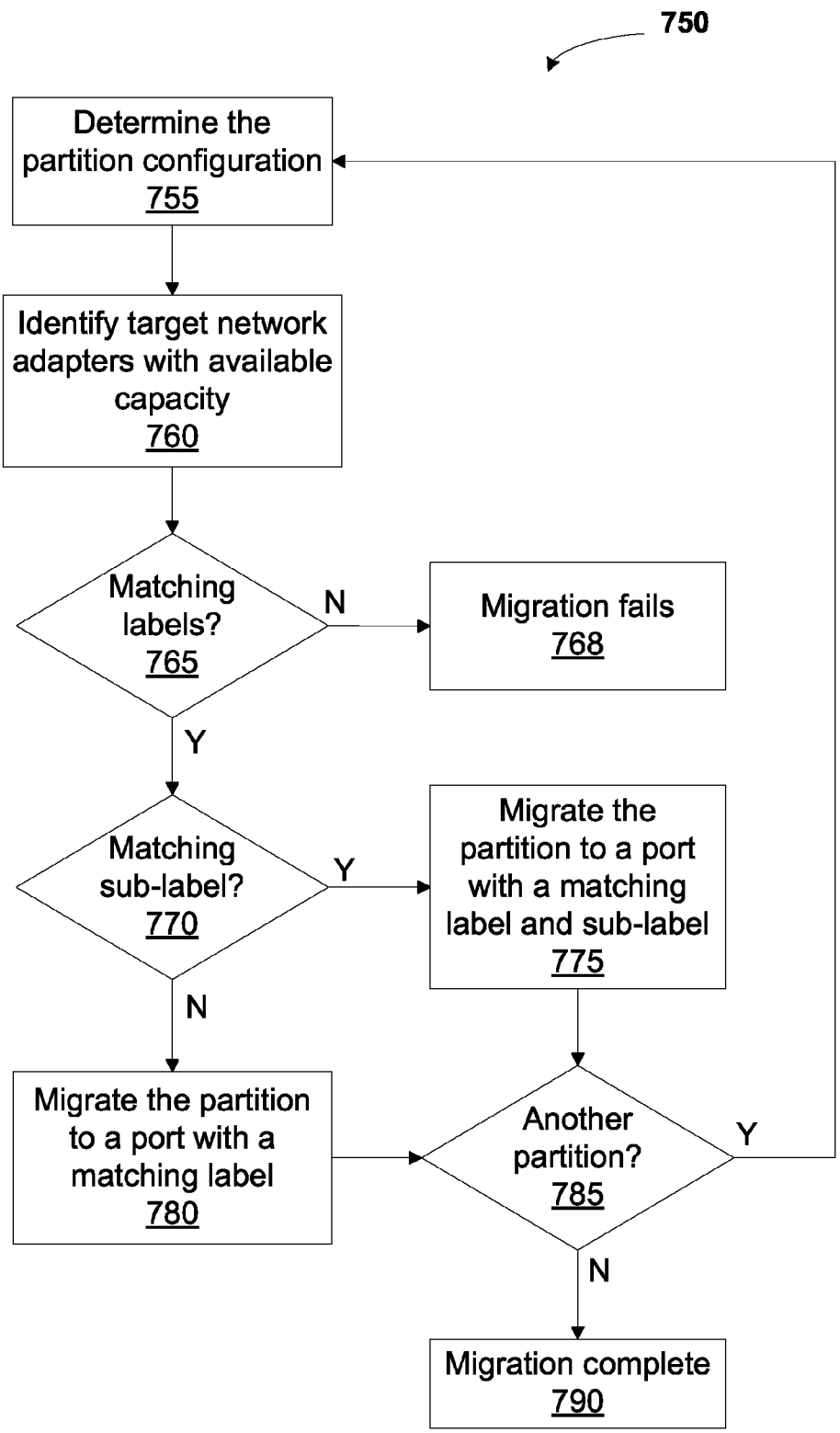
FIG. 7C is a flowchart illustrating a method for automatically migrating partitions, according to one embodiment of the invention.

FIG. 7C is a flowchart 750 illustrating a method for automatically migrating a partitions, according to one embodiment of the invention. Automatic migration of LPARs assigned to the physical ports of a NA 416 may be advantageous when a computer 430 is being brought down. At step 755 the hardware management console 450 determines the LPAR 420 configuration. More specifically, the hardware management console 450 may determine the specific network topology that is needed by LPAR 420 based on the label and sub-label of the port assigned to the LPAR 420.

At step 760 the hardware management console 450 identifies target NAs 416 with available capacity to service the LPAR 420. At step 765 the hardware management console 450 determines if any of the target NAs 416 have ports with labels that match the label included in the configuration for the LPAR 420. If at step 765, none of the target NAs 416 have ports with labels that match the label of the LPAR 420, then at step 768 the migration fails. The user may be informed via an error message that no ports are available for the migration. Otherwise, at step 770 the hardware management console 450 determines if any of the ports with a matching label also have a sub-label that matches the sub-label included in the configuration for the LPAR 420. When the configuration does not include a sub-label, then any sub-label of a port is considered to be matching sub-label. In one embodiment of the invention, wildcard matching may be used to match the label and/or sub-label.

If, at step 770 the hardware management console 450 determines that any of the ports with a matching label also have a sub-label that matches the sub-label included in the configuration for the LPAR 420, then at step 775 the hardware management console 450 instructs the migration application to migrate the LPAR 420 to a target port with a matching label and matching sub-label and proceeds to step 785. If, at step 770 the hardware management console 450 determines that none of the ports with a matching label also have a sub-label that matches the sub-label included in the configuration for the LPAR 420, then at step 780 the hardware management console 450 instructs the migration application to migrate the LPAR 420 to a target port with a matching label and non-matching sub-label and proceeds to step 785.

At step 785 the hardware management console 450 determines if there is another LPAR 420 to migrate, and, if so, then the hardware management console 450 returns to step 755.

Otherwise, at step 790 the migration of one or more LPARs 420 is complete. In this manner, the hardware management console 450 may migrate one or more LPARs 420 from a first set of physical ports to another set of physical ports without requiring any selection of specific ports by a user.

While the foregoing is directed to embodiments of the present invention, other and further embodiments of the invention may be devised without departing from the basic scope thereof, and the scope thereof is determined by the claims that follow.

What is claimed is:

1. A method of migrating a logical partition (LPAR), comprising:
    determining a configuration of the LPAR having allocated resources residing on a computer and assigned to a first physical port of the computer, wherein the configuration includes a label that specifies a first network topology that is provided by the first physical port of the computer, and a sub-label that specifies a characteristic of the first physical port;
    identifying a first target physical port with available capacity to service the LPAR, the first target physical port being identified by a port label and port sub-label that matches the label and sub-label included in the configuration of the LPAR and that specifies a second network topology that is provided by the first target physical port;
    automatically selecting the first target physical port from one or more target physical ports, each having a respective port label and port sub-label, based on the label and sub-label included in the configuration for the LPAR; and
    migrating the LPAR from the first physical port to the selected first target physical port by reassigning the LPAR to the selected first target physical port.

2. The method of claim 1, further comprising identifying a second target physical port with available capacity to service the LPAR, wherein the second target physical port also has a port label and port sub-label that matches the label and sub-label included in the configuration of the LPAR.

3. The method of claim 1, further comprising receiving user input selecting the first target physical port from one or more target physical ports, each of the respective one or more target physical ports having a port label and port sub-label.

4. The method of claim 3, wherein the one or more target physical ports are listed in an order based on the port label of each of the one or more target physical port matches at least a portion of the label included in the configuration of the LPAR.

5. The method of claim 1, further comprising receiving user input specifying the sub-label for the first physical port.

6. The method of claim 1, wherein the sub-label included in the configuration for the LPAR comprises a wildcard character.

7. The method of claim 1, wherein the first target physical port is a physical port of a different computer than the first physical port.

8. The method of claim 1, further comprising receiving user input specifying the label included in the configuration for the LPAR.

9. The method of claim 1, wherein the computer is provided in a cloud environment.

* * * * *